US009849839B2

(12) United States Patent
Buckland

(10) Patent No.: US 9,849,839 B2
(45) Date of Patent: Dec. 26, 2017

(54) MOVABLE CONTAINER WITH LOCKING SYSTEM FOR PICKUP TRUCK

(71) Applicant: George P. Buckland, Seward County, KS (US)

(72) Inventor: George P. Buckland, Seward County, KS (US)

( * ) Notice: Subject to any disclaimer, the term of this patent is extended or adjusted under 35 U.S.C. 154(b) by 77 days.

(21) Appl. No.: 15/061,371

(22) Filed: Mar. 4, 2016

(65) Prior Publication Data

US 2017/0253187 A1      Sep. 7, 2017

(51) Int. Cl.
*B60R 9/06* (2006.01)

(52) U.S. Cl.
CPC ....................... *B60R 9/06* (2013.01)

(58) Field of Classification Search
CPC . B60R 9/00; B60R 9/065; B60R 11/06; B60P 7/0892; B25H 3/02
USPC ........................................................ 224/404
See application file for complete search history.

(56) References Cited

U.S. PATENT DOCUMENTS

| | | | | |
|---|---|---|---|---|
| 4,998,425 A * | 3/1991 | Hoogland | ................. | B60R 9/00 224/315 |
| 5,037,153 A * | 8/1991 | Stark | ......................... | B60R 9/00 224/281 |
| 5,088,636 A * | 2/1992 | Barajas | .................... | B60R 11/06 224/281 |
| 6,079,585 A * | 6/2000 | Lentini | ..................... | B60R 9/00 220/210 |
| 6,149,040 A * | 11/2000 | Walker | ..................... | B60R 7/02 224/404 |
| 6,170,724 B1 * | 1/2001 | Carter | ....................... | B60R 9/00 220/4.29 |
| 6,220,478 B1 * | 4/2001 | Ingerson | ................... | E05C 3/14 220/326 |
| 6,224,138 B1 * | 5/2001 | Adsit | ....................... | B60J 7/041 224/404 |
| 6,481,604 B1 * | 11/2002 | Beene | ....................... | B60R 9/00 224/403 |
| 6,523,877 B1 * | 2/2003 | Damian | .................... | B60R 9/00 224/404 |
| 6,536,826 B1 * | 3/2003 | Reed | ........................ | B60P 3/42 224/404 |
| 6,554,169 B1 * | 4/2003 | Furlong | .................... | B60R 9/00 224/404 |
| 6,626,479 B1 * | 9/2003 | Skoug | ....................... | B60R 9/00 224/404 |
| 6,626,480 B2 * | 9/2003 | Anderson | ................. | B60P 7/08 224/404 |

(Continued)

*Primary Examiner* — Peter Helvey
(74) *Attorney, Agent, or Firm* — W. Thomas Timmons

(57) ABSTRACT

A system for securely locking a storage box in a bed for a pickup truck, includes a storage box housing, a storage box lid and a lock for the lid. A plurality of wheels align with dips in the bottom of the truck bed. Guide pins align with a dip to keep the storage box housing centered. Horizontal locking pins are positioned inside the housing having both a retracted position and a locking position, in which each locking pin is partly into the nearest side wall. At least one vertical locking pin is positioned inside the housing having both a retracted position and a locking position partly within a hole in the ridge of the bottom wall. Once locking pins are engaged, they can only be disengaged from inside the housing when the lid for the storage box is open. Various holes are reinforced.

20 Claims, 21 Drawing Sheets

(56) References Cited

U.S. PATENT DOCUMENTS

| | | | | |
|---|---|---|---|---|
| 7,017,966 B2* | 3/2006 | Clonan | ............... | B60R 9/00 224/404 |
| 7,044,528 B2* | 5/2006 | Rhodus | ............... | B60P 1/52 224/404 |
| 7,726,719 B1* | 6/2010 | Barron | ............... | B60R 9/065 224/404 |
| 8,240,527 B1* | 8/2012 | Casselton | ............... | B60R 11/06 224/281 |
| 8,281,967 B2* | 10/2012 | Evans | ............... | B60R 9/00 224/404 |
| 8,950,427 B2* | 2/2015 | Gallo | ............... | B60R 15/00 137/259 |
| 2002/0057001 A1* | 5/2002 | Wilding | ............... | B60R 9/00 296/37.6 |
| 2003/0102322 A1* | 6/2003 | Jones | ............... | B65D 7/22 220/836 |
| 2004/0118887 A1* | 6/2004 | Axelson | ............... | B60R 9/00 224/404 |
| 2006/0065687 A1* | 3/2006 | Reed | ............... | B60P 1/003 224/404 |
| 2006/0097021 A1* | 5/2006 | Stanton | ............... | B60R 5/04 224/510 |
| 2006/0102669 A1* | 5/2006 | Fouts | ............... | B60R 9/00 224/404 |
| 2007/0039957 A1* | 2/2007 | Shulz | ............... | B60R 9/00 220/210 |
| 2011/0132947 A1* | 6/2011 | Spencer | ............... | B60R 11/06 224/404 |
| 2012/0086243 A1* | 4/2012 | Daniels, Jr. | ............... | B25H 3/02 297/188.09 |
| 2014/0175137 A1* | 6/2014 | Roach | ............... | B60P 7/0892 224/404 |
| 2014/0326764 A1* | 11/2014 | Roach | ............... | B60R 9/065 224/404 |
| 2014/0346205 A1* | 11/2014 | Roach | ............... | B60P 7/0892 224/404 |
| 2015/0048129 A1* | 2/2015 | Wilson | ............... | B60R 9/065 224/404 |
| 2015/0158436 A1* | 6/2015 | Zaiser | ............... | B60R 11/06 224/404 |
| 2016/0167718 A1* | 6/2016 | Wilson | ............... | B62D 33/0207 224/404 |

* cited by examiner

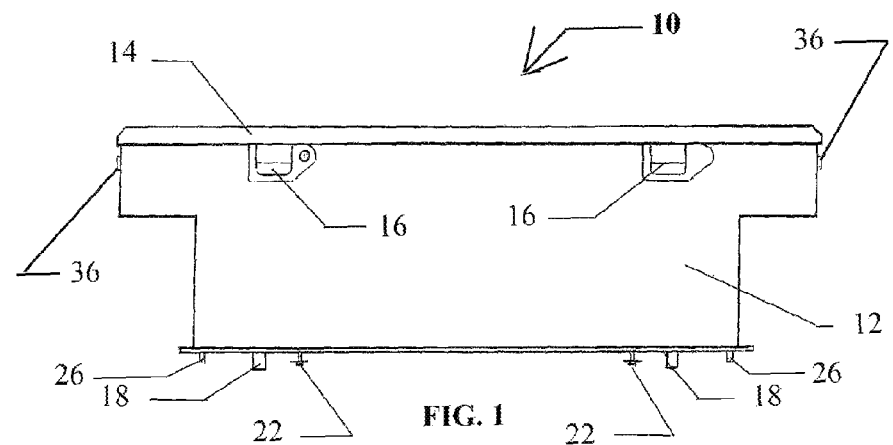
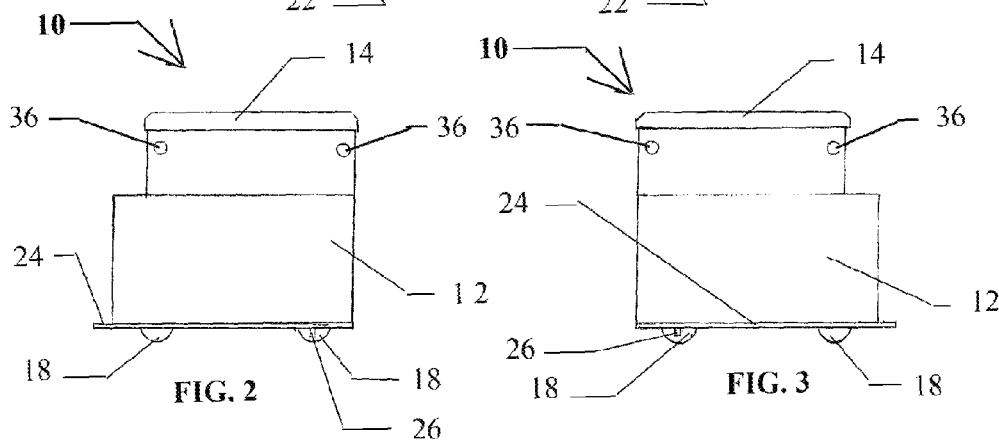
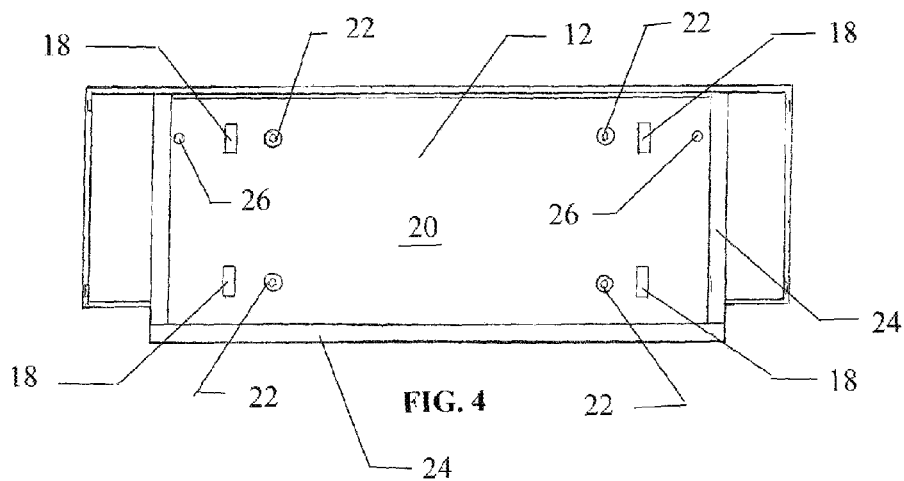

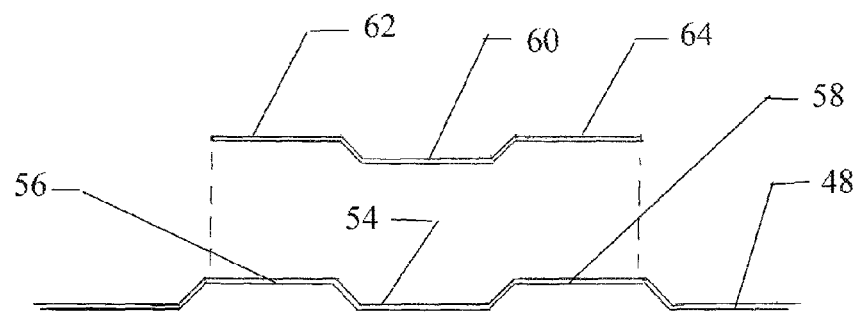
FIG. 16
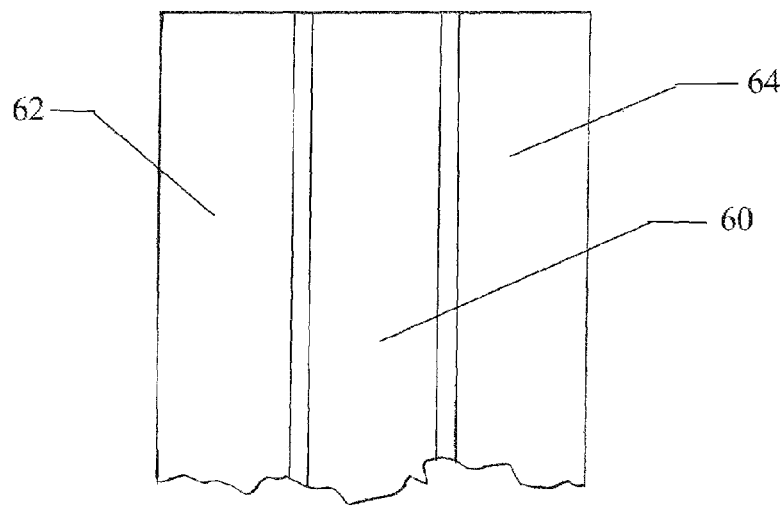
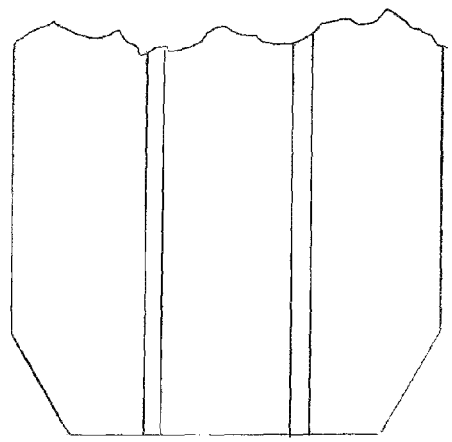
FIG. 17

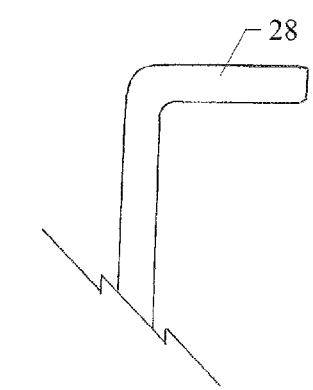
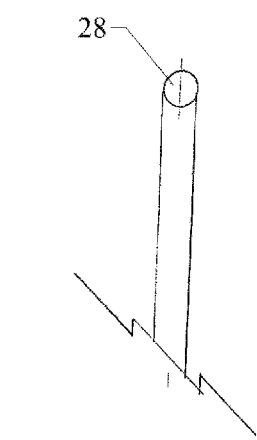
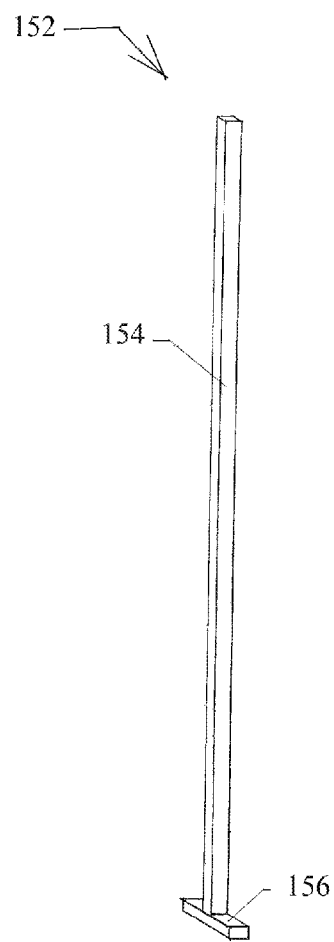
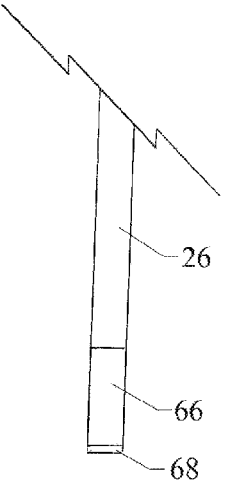
FIG. 18
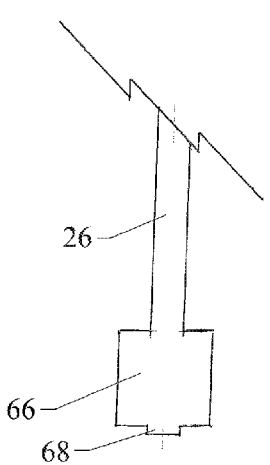
FIG. 20
FIG. 19   FIG. 21   FIG. 22

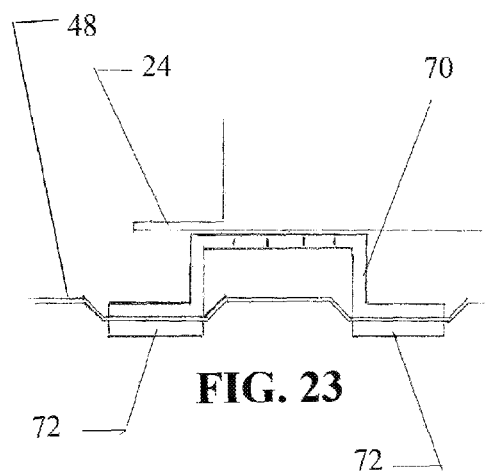
FIG. 23
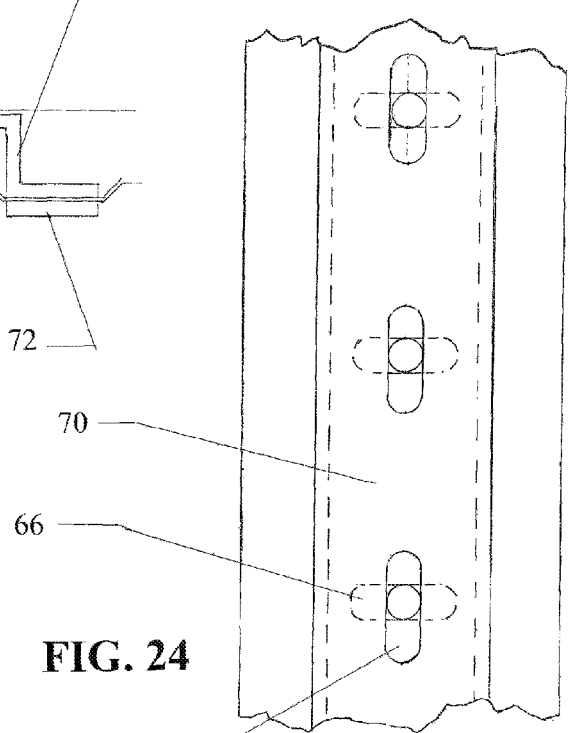
FIG. 24
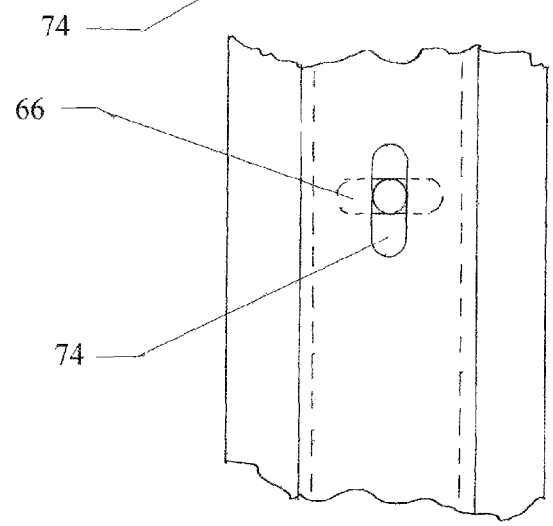

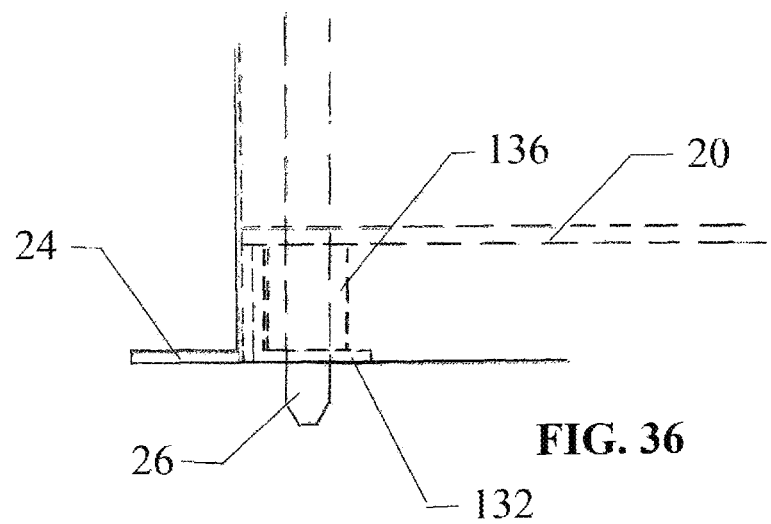
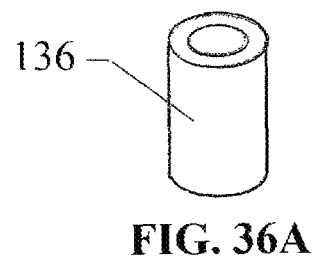
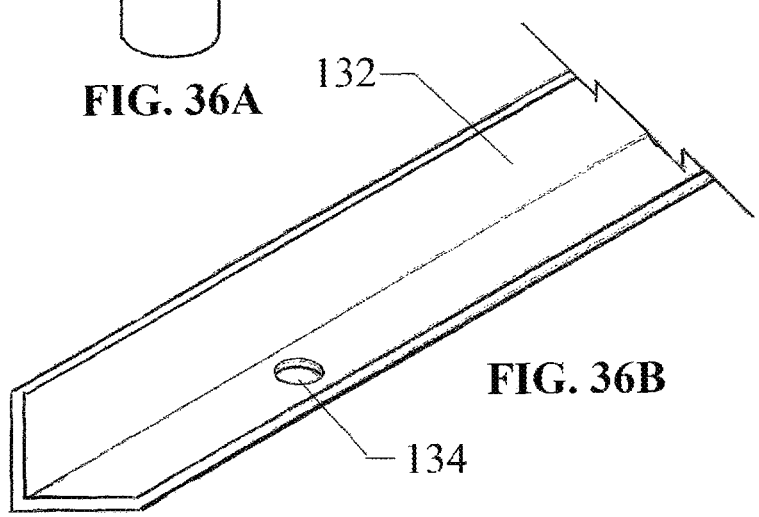

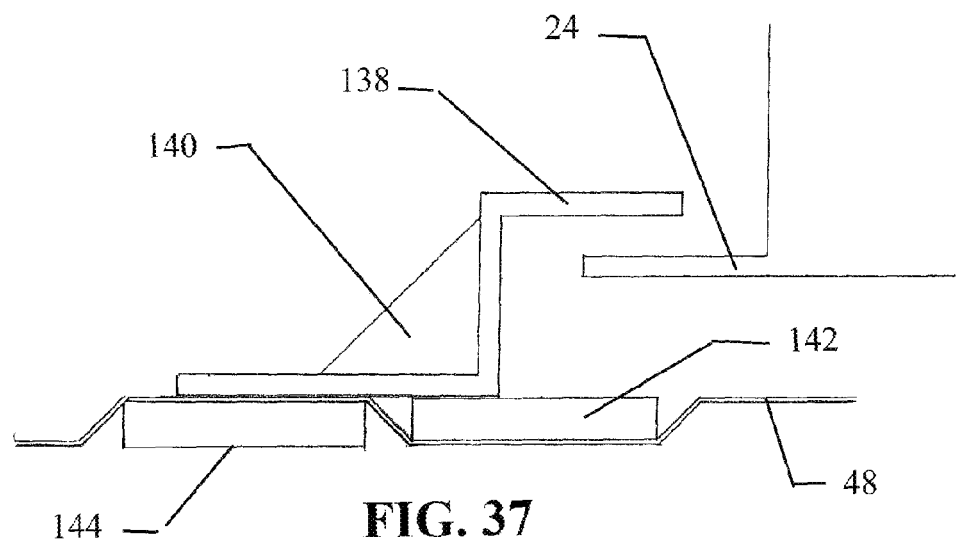
FIG. 37
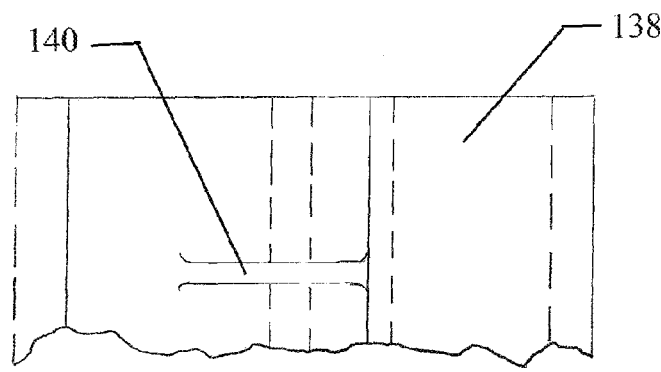
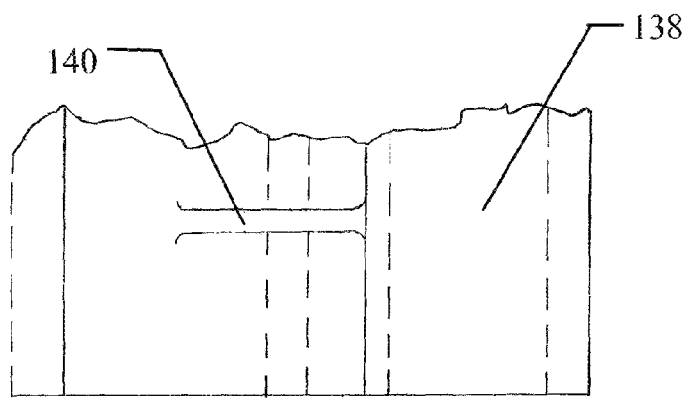
FIG. 38

MOVABLE CONTAINER WITH LOCKING SYSTEM FOR PICKUP TRUCK

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to security of a locking storage box, such as a toolbox or cooler to the bed of a pickup truck and more particularly, to securely locking a storage box in multiple positions when the storage box can be easily moved from one end of the bed to the other or even onto the tailgate, or removed from the pickup.

2. Description of Related Art

U.S. Pat. No. 5,186,510 shows a foldable toolbox for pickup trucks. FIG. 1 shows both wheels and locking bolts 73 and 75. It also shows a short channel, which with two tools may be loosened and slid over and removed from the channel. FIG. 3 shows that this design may require two tools and may have to unload cargo to access and reach an inner nut and outer bolt under the short channel to loosen and tighten. This is unlike the present invention, which can be secured and unsecured in many locations without special tools.

U.S. Pat. No. 5,518,158 shows a toolbox installed at the tailgate and so that the tailgate forms part of the toolbox. This is unlike the present invention which can be moved to a secure position on the tail gate or near the tailgate in a position that still allows the tailgate to be closed.

U.S. Pat. No. 5,947,356 shows a latch system 10 with a clamp type locking arm 60 and an eye-bolt, the shaft 40 that must screw into a secure piece of the truck bed. Again, this is unlike the present invention, which locks with simple movement in an out of the storage box and into either the side or bottom of the truck bed by various locking pins.

U.S. Pat. No. 6,945,580 shows a motorized toolbox with wheels. FIG. 4 shows a lock, which is activated by a solenoid 62, although it is not clear how the lock would prevent some one or more people from simply lifting the toolbox from the truck bed with such a latch. The present invention uses manual latches, which prevent the storage box from being moved in any direction.

BRIEF SUMMARY OF THE INVENTION

A system for securely locking a storage box otherwise moveable along the length of a bed for a pickup truck, the bed having a bottom wall, a first side wall, a second side wall and a front wall, said bottom wall having a rear edge and a plurality of alternating dips and ridges running from the front wall to the rear edge of the bed. The system includes a storage box housing, a storage box lid and a lock for the lid, so that the lid can be locked shut on the storage box. A plurality of wheels are rotatably coupled to and extend downwardly from the housing. At least two wheels are positioned in and aligned with a first dip between two adjacent ridges and at least two wheels are positioned in and aligned with a second dip between two adjacent ridges. In a preferred system a reinforcement dip and adjacent ridges is installed in the dip used for the wheels aligned with the first dip and onto the adjacent ridges and a reinforcement dip and adjacent ridges is installed in the dip used for the wheels aligned with the second dip and onto the adjacent ridges to prevent the wheels from damaging the dips in the truck bed. A suitable material for the reinforcement is stainless steel. At least one guide pin is coupled to and extending downwardly from the housing, wherein the at least one guide pin is positioned in and aligned with a dip between two adjacent ridges, wherein the at least one guide pin helps position wheels and prevent the wheels from jumping from their respective dips and centers the storage box between the side walls of the truck bed at the bulkhead location.

At least two horizontal locking pins, and preferably four, are positioned inside the housing having both a retracted position entirely or almost entirely within the housing and a locking position partly within the housing and each locking pin partly into the nearest side wall. Each side wall has a hole or partial hole for receiving each horizontal locking pin that is nearest to that wall and wherein the locking position can only be engaged and disengaged from inside the housing when the lid for the storage box is open, whereby the pins in the locked position cannot be disengaged when the lid is closed and locked. The hole in each side wall has an angle iron reinforcement.

A preferred form of the system also includes a vertical locking pin, and preferably more than one, positioned inside the housing having both a retracted position entirely within the housing and a locking position partly within the housing and partly within a ridge of the bottom wall. The ridge has a hole for receiving the vertical locking pin, and the locking position can only be engaged and disengaged from inside the housing when the lid for the storage box is open, so that the vertical pin in the locked position cannot be disengaged when the lid is closed and locked. The hole for the vertical locking pin is reinforced with steel.

These and other objects, advantages and features of this invention will be apparent from the following description taken with reference to the accompanying drawing, wherein is shown a preferred embodiment of the invention.

BRIEF DESCRIPTION OF THE SEVERAL VIEWS OF THE DRAWING

FIG. 1 is a front elevation view of a storage box according to the present invention looking toward the front wall of a bed for a pickup truck;

FIG. 2 is a left side elevation view of the storage box of FIG. 1;

FIG. 3 is a right side elevation view of the storage box of FIG. 1;

FIG. 4 is a bottom view of the storage box of FIG. 1;

FIG. 16 is an elevation view of a reinforcement for wheels;

FIG. 17 is a top view of the reinforcement for wheels of FIG. 16;

FIG. 18 is an elevation view of an optional form of a vertical locking pin in a released position;

FIG. 19 is a bottom view minus the handle of the optional form of the vertical locking pin of FIG. 18;

FIG. 20 is an elevation view of an optional form of the vertical locking pin in a locked position;

FIG. 21 is a bottom view minus the handle of the optional form of the vertical locking pin of FIG. 20;

FIG. 22 is a top left perspective view of a retriever/pusher according to the present invention;

FIG. 23 is an elevation view of an optional vertical locking pin hold-down track;

FIG. 24 is a top view of the optional vertical locking pin hold-down of FIG. 21;

FIG. 36 is an elevation view of an optional reinforcement for the vertical locking pin in the trolley;

FIG. 36A is a perspective view of a reinforcing spacer for the vertical locking pin, shown in hidden line in FIG. 36;

FIG. 36B is a perspective view of a piece of angle iron reinforcement for the vertical locking pin, shown in hidden line in FIG. 36;

FIG. 37 is a elevation view of an optional truck bed safety bracket;

FIG. 38 is a top view of the optional truck bed safety bracket of FIG. 37;

DETAILED DESCRIPTION OF THE INVENTION

Figure 5:
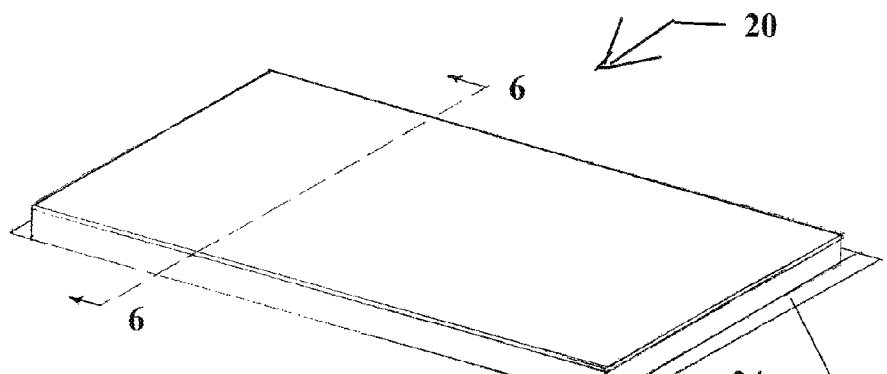
FIG. 5 is a top right side perspective view of the bottom section of trolley of the storage box of FIG. 1, forming a wheel guard.

Referring now to the drawing, and in particular to FIGS. 1 through 4, a system generally referred to by reference numeral 10 for securely locking a storage box otherwise moveable along the length of a bed for a pickup truck, the bed having a bottom wall, a first side wall, a second side wall and a front wall, said bottom wall having a rear edge and a plurality of alternating dips and ridges running from the front wall to the rear edge of the bed, includes a storage box housing 12, a storage box lid 14 and a lock 16 for the lid, so that the lid can be locked shut on the storage box. A plurality of wheels 18 are rotatably coupled to and extend downwardly from housing 12. The bottom 20 of storage box housing 12 is a trolley or carriage.

Figure 6:
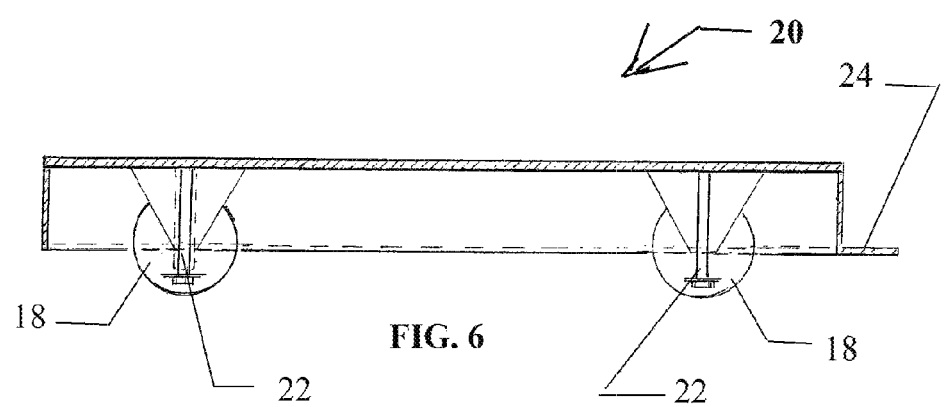
FIG. 6 is a sectional view taken along the lines 6-6 of FIG. 5.
Figure 7:
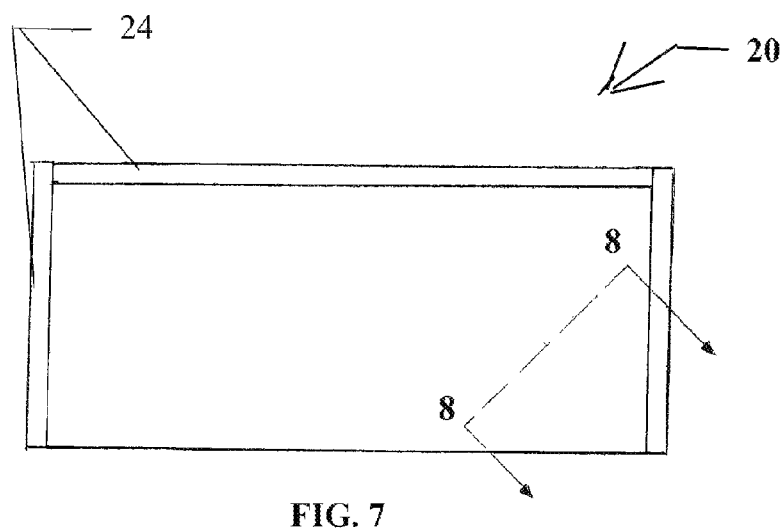
FIG. 7 is a top view of the trolley of FIG. 5.
Figure 8:
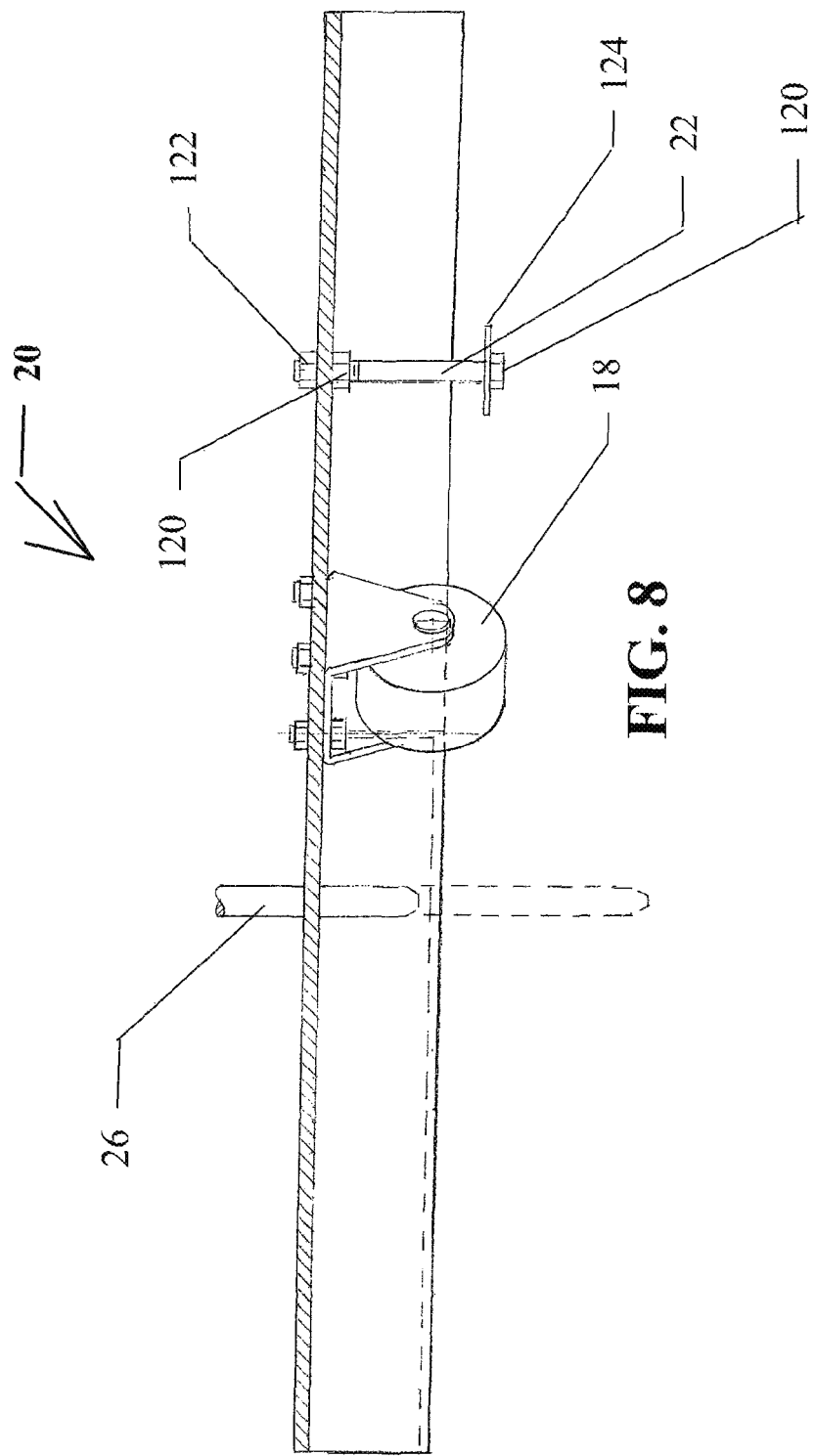
FIG. 8 is a sectional view taken along the lines 8-8 of FIG. 7.
Figure 9:
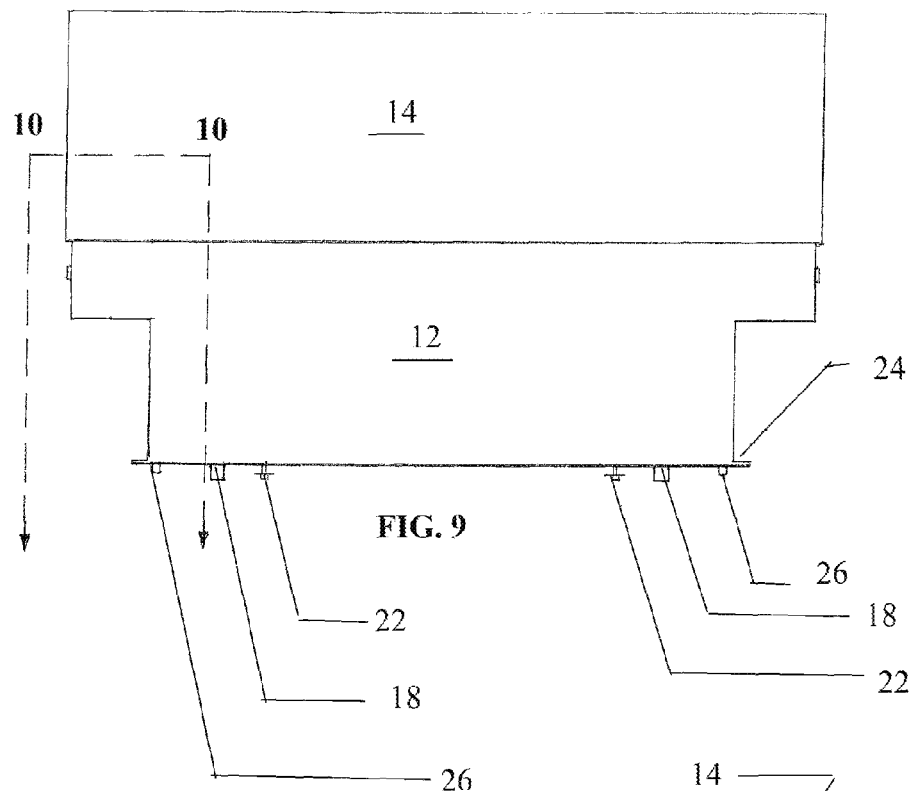
FIG. 9 is a front elevation view of the storage box of FIG. 1 with the lid open.
Figure 11:
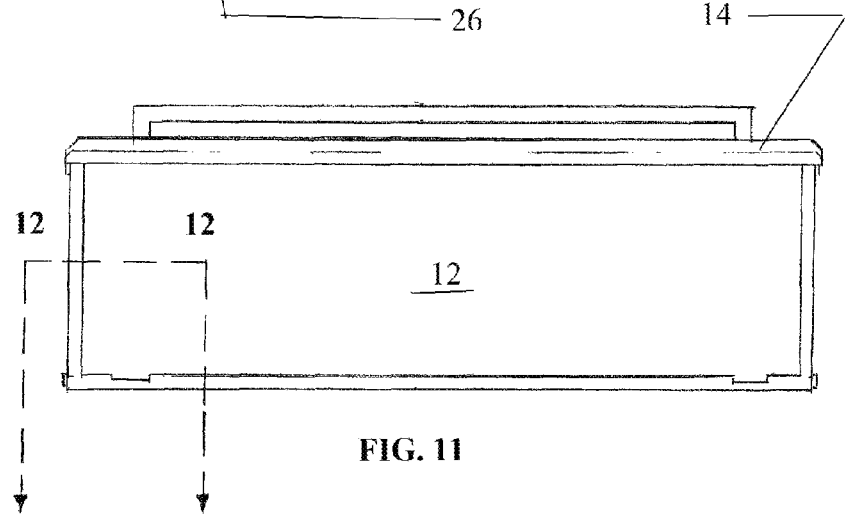
FIG. 11 is a top view of the storage box as shown in FIG. 9 with the lid open.
Figure 10:
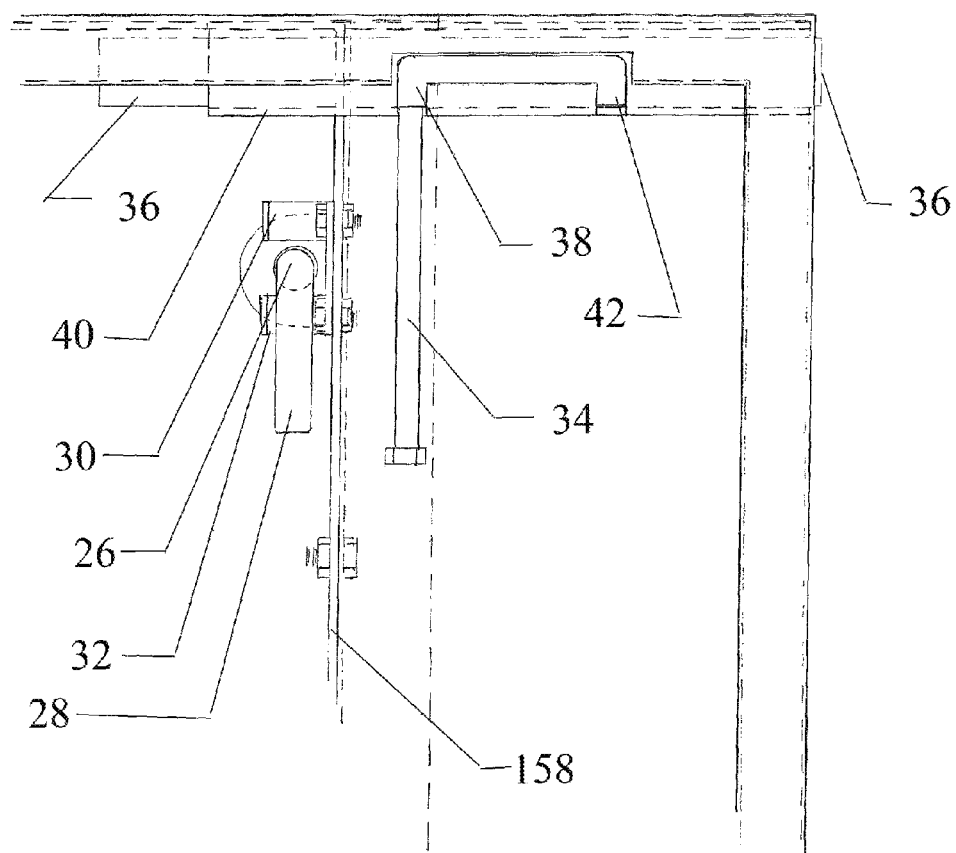
FIG. 10 is a top sectional view taken along the lines 10-10 of FIG. 9.
Figure 12:
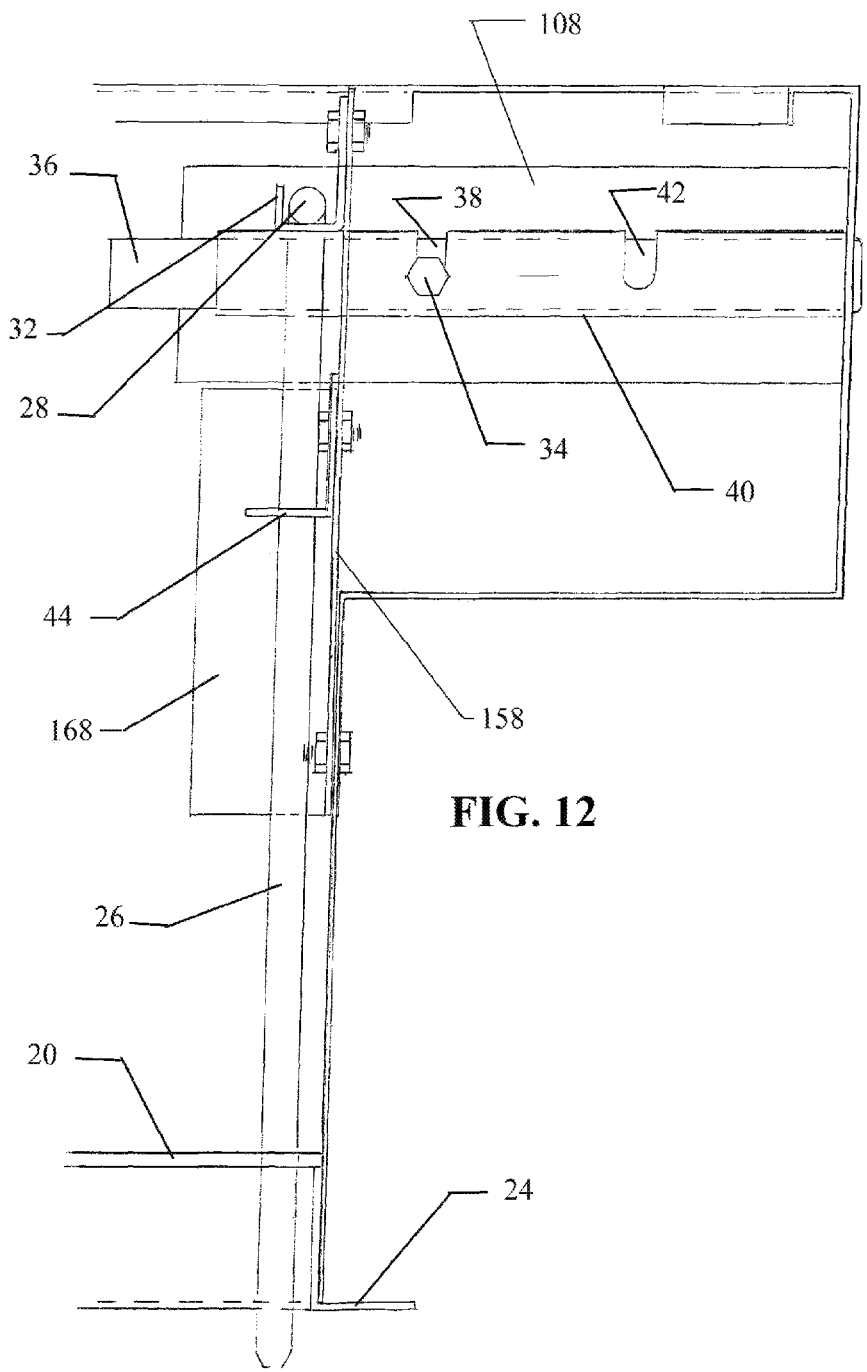
FIG. 12 is an elevation sectional view taken along the lines 12-12 of FIG. 11 showing both a vertical locking pin and a horizontal locking pin.
Figure 13A:
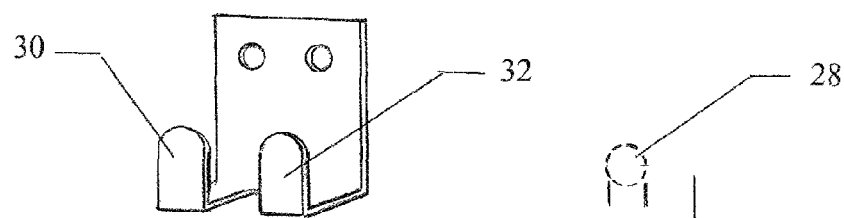
FIG. 13A is a front right view of an upper bracket for vertical locking pin shown in FIG. 13.
Figure 13B:
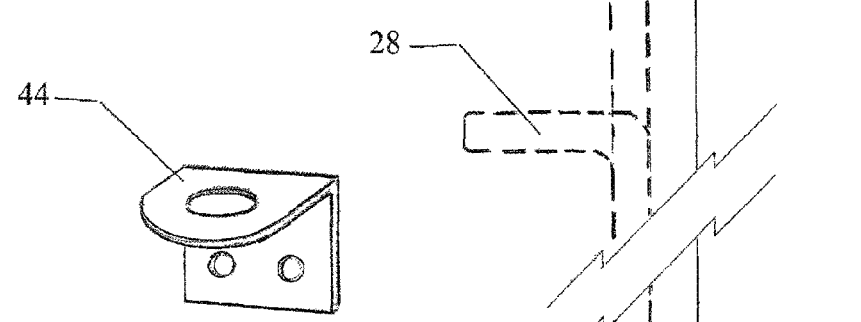
FIG. 13B is a top front right view of a lower bracket for the vertical locking pin shown in FIG. 13.
Figure 13:
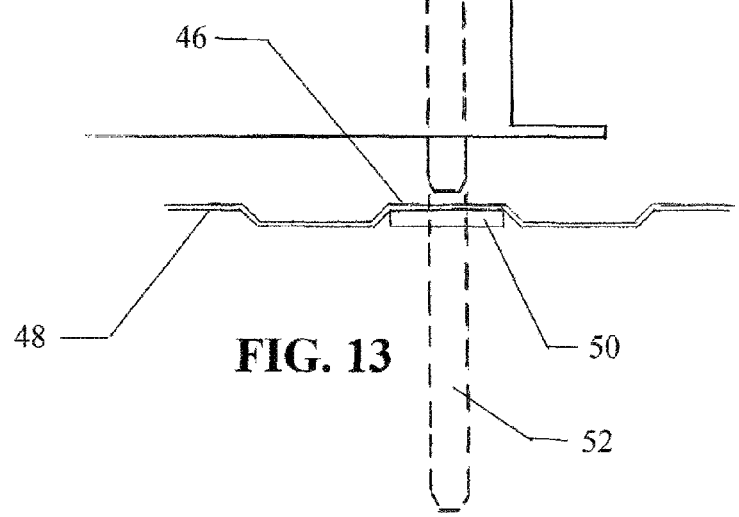
FIG. 13 is a view of similar to that of FIG. 12, but showing a vertical locking pin in hidden lines, both unengaged and engaged, and showing the guide brackets broken out.
Figure 14:
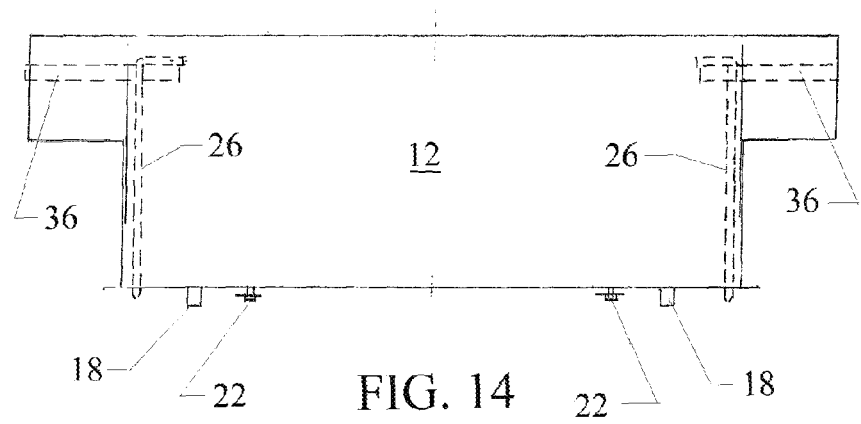
FIG. 14 is a elevation view of storage box of FIG. 1, showing both horizontal locking pins and vertical locking pins in the unengaged positions.
Figure 15:
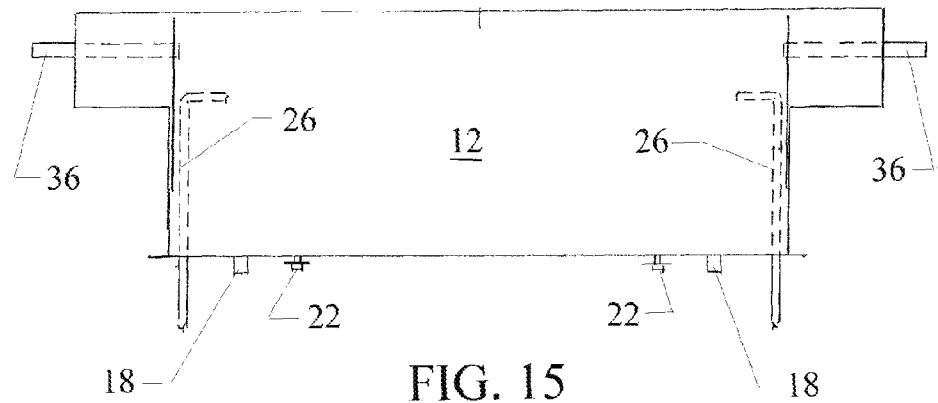
FIG. 15 is a elevation view of storage box of FIG. 1, showing both horizontal locking pins and vertical locking pins in the engaged positions.
Figure 25:
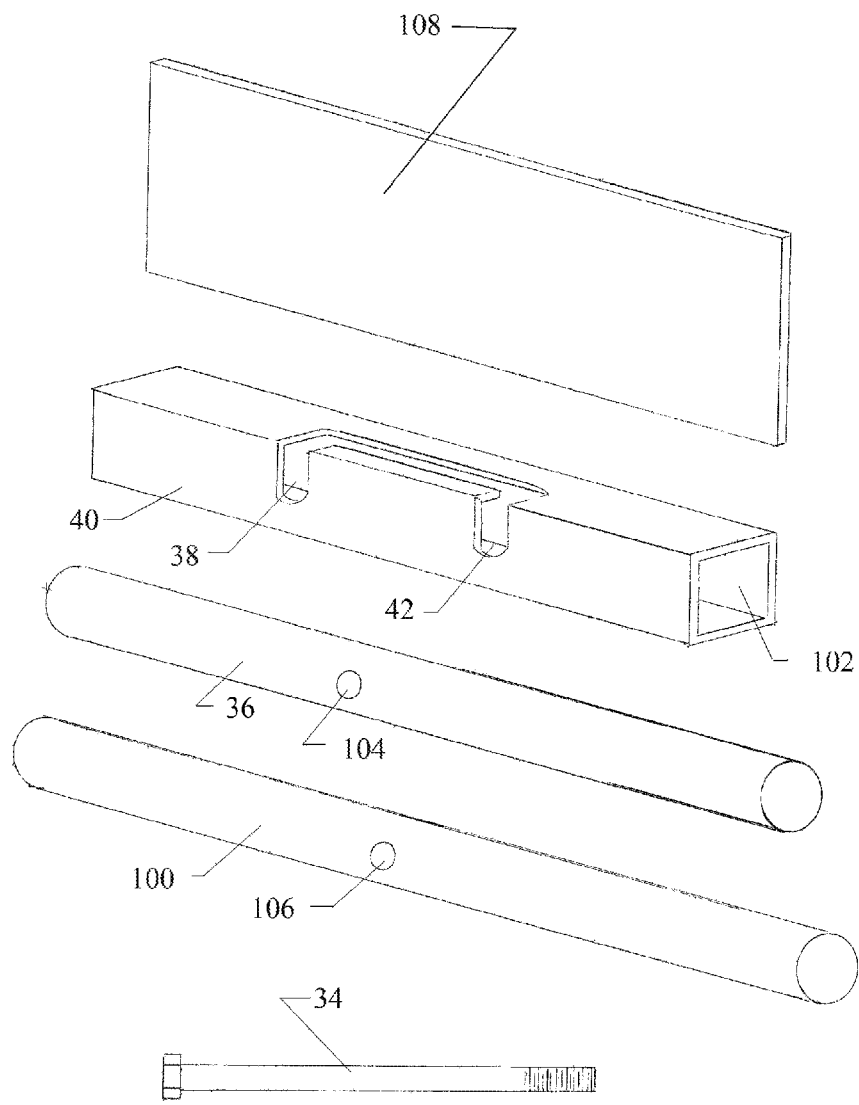
FIG. 25 is an assembly view of a horizontal locking pin.

Referring also to FIGS. 5, 6 and 7, trolley 20 is made of a sturdy material to support wheels 18 and guide pins 22. Trolley 20 also includes a lip 24 on three sides. Referring also to FIGS. 9, 10 and 11, and in particular to FIG. 10, a handle 28 of vertical locking pin 26 is positioned over one of two upper bracket legs 30 and 32 or over two separate brackets, so that vertical locking pin 26 is held in the disengaged position. A bolt 34 is screwed into horizontal locking pin 36. Bolt 34 is in an unlocked position 38 of horizontal locking pin slide lock 40. Slide lock 40 also has a locked position 42. Referring now to FIGS. 8, 12, 13, 14 and 15, handle 28 of vertical locking pin 26 must be lifted and turned to disengage from upper bracket leg 32. Vertical locking pin 26 can then be lowered until handle 28 engaged a lower bracket 44 and vertical locking pin 26 is in the engaged position so that it is locked into position. In the locked position 52, vertical locking pin 26 goes through a ridge 46 in bottom wall 48 of the truck bed and reinforcement 50. Referring also to FIGS. 18 through 21 and FIGS. 23 and 24, shown as an additional option, near the bottom of vertical locking pin 26 is a locking wing 66 and a locking wing stop 68. A vertical pin receiver, which is a wing hold-down 70 is affixed over a ridge of bottom wall 48 of the truck bed, but can be placed over a dip. Steel hold-down reinforcers 72 are below the adjacent dips and attached to locking wing hold down 70 by bolts or rivets or other means. Locking wing 66 is inserted into locking wing insert 74 and then turned ninety degrees in order to lock vertical locking pin 26 in the engaged position. A preferred form of the system includes more than one vertical locking pin, and preferably two or more, positioned inside the housing having both a retracted position almost entirely within housing 20 and a locking position where locking wings 66 and 68 are captured inside of vertical pin receiver 70. The receiver has a hole for receiving the vertical locking pin, and the locking position can only be engaged and disengaged from inside the housing when the lid for the storage box is open, so that the vertical pin in the locked position cannot be disengaged when the lid is closed and locked. The hole for the vertical locking pin is reinforced with iron.

Referring now to FIGS. 16 and 17, at least two wheels 18 are positioned in and aligned with a first dip 54 between two adjacent ridges 56 and 58 and at least two wheels are positioned in and aligned with a second dip between two adjacent ridges. In a preferred system a reinforcement dip 60 with adjacent ridges 62 and 64 is installed in dip 54. Reinforcement dip 60 is used for the wheels aligned with the first dip and onto the adjacent ridges and a reinforcement dip and adjacent ridges is installed in the dip used for the wheels aligned with the second dip and onto the adjacent ridges to keep the storage box at the correct height the entire length of a damaged pickup truck bed and help with smooth operation and to prevent the wheels from damaging the dips in the bottom wall 48 of the truck bed. One suitable material for the reinforcement is stainless steel. Off the shelf wheels are typically made from forged steel, but the wheels can be of other material. As a result, the wheels are normally coated with a softer material such as handle dip or other suitable material. A similar reinforcement is installed for the wheels on the opposite side of the storage box.

At least one guide pin 22 is coupled to and extending downwardly from housing 12, wherein the at least one guide pin is positioned in and aligned with a dip between two adjacent ridges, wherein the at least one guide pin helps position wheels and prevent the wheels from jumping from their respective dips and to center the storage box between the side walls of the pickup truck bed at the bulkhead or can be made to run the length of the truck bed.

Again referring to FIGS. 10 and 12, but also to FIGS. 25, 29, 30 and 31, at least two horizontal locking pins 36, and preferably four, are positioned inside housing 12 having both a retracted position almost entirely within housing 12 when bolt 34 is in unlocked position 38 and an extended position in which each horizontal locking pins 36 and 100 is partly within the housing and partly into the nearest side wall of the truck bed, when bolt 34 is in locked position 42. Installation of locking pins would, of course, be reversed for installation on the opposite side of the storage box. Each side wall or the reinforcement 76 of each side wall has a hole 78, which can be a complete or a partial hole for receiving each horizontal locking pin that is nearest to that wall and wherein the locking position can only be engaged and disengaged from inside the housing when the lid for the storage box is open, whereby the pins in the locked position cannot be disengaged when the lid is closed and locked. The hole in each side wall has an angle iron reinforcement 80. Reinforcement 76 also includes a piece of iron hold down 82 forming partial or half-moon hole 78 attached to angle iron 80 by a series of bolts 84 and nuts 86. Depending on the desired length of angle iron 80 and iron hold down 82, there can be two or more bolts 84. The length of angle iron 80 and iron hold down 82 may be shorter if there are multiple storage boxes used at the same time. The holes for bolts 84 can be vertically slotted if positioning becomes an issue. A series of carriage bolts 88 and related nuts 90 hold angle iron assembly 82, inner wall 92 and outer wall 94 of the truck gunnels in place with spacer 96. Spacer 96 makes angle iron 80 plum. Either horizontal locking pin 36 or an alternative locking pin 100 inserts into either end 102 of slide lock 40. Both horizontal locking pins 36 and 100 have threaded holes for engaging the threads of bolt 34, after the locking pins have already been inserted into slide lock 40. Slide lock 40 is mounted on an iron support plate 108.

Figure 28:
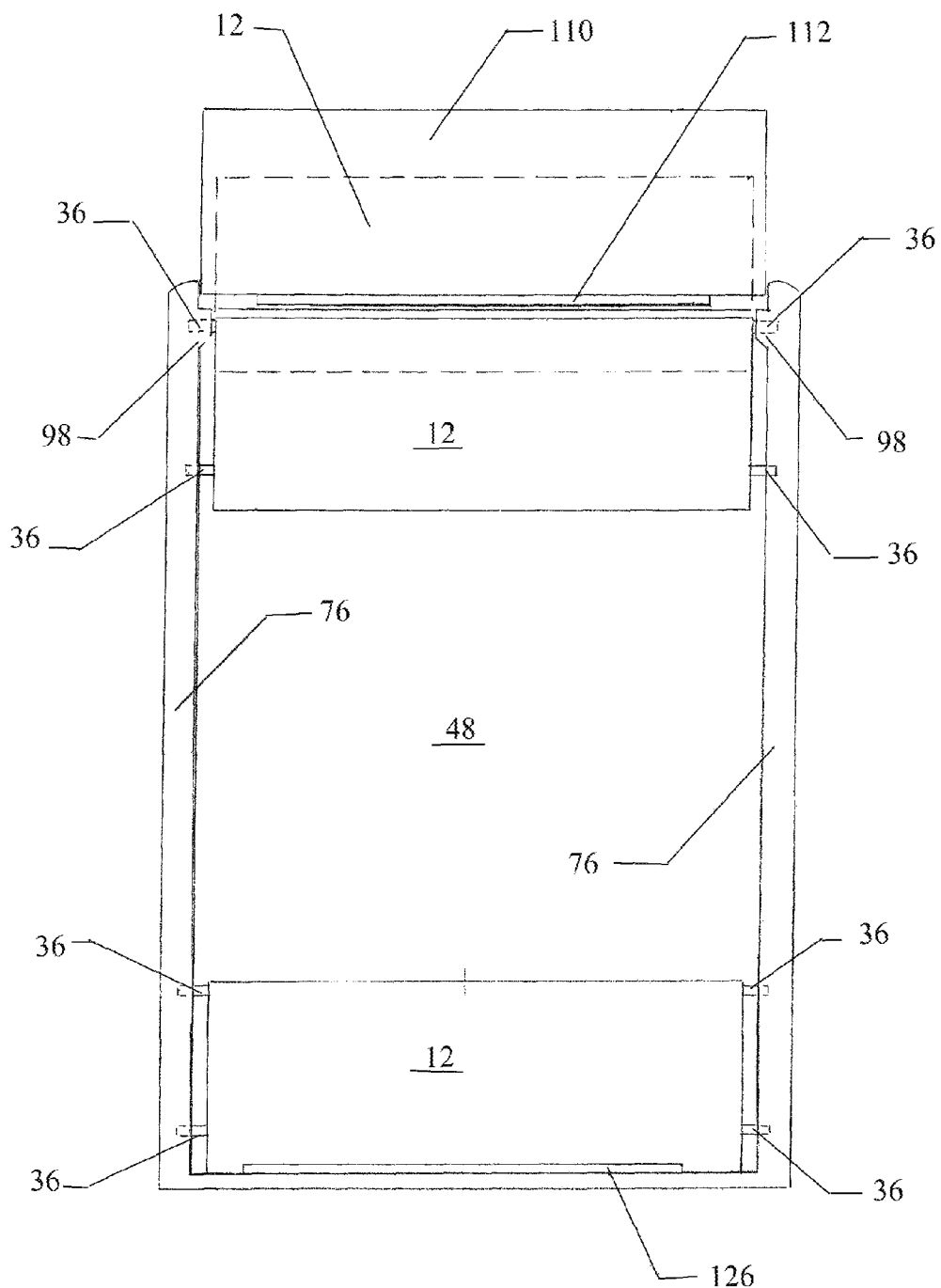
FIG. 28 is a top view of the truck bed showing three different positions for the storage box.
Figure 29:
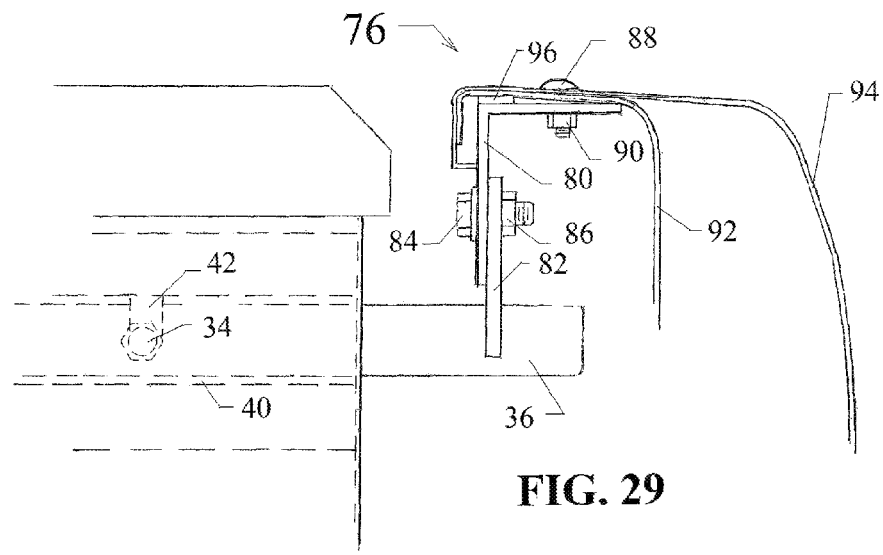
FIG. 29 is an elevation view of horizontal locking pin and a partial hole and reinforcement for the hole in a position located in the bed of the pickup truck.
Figure 30:
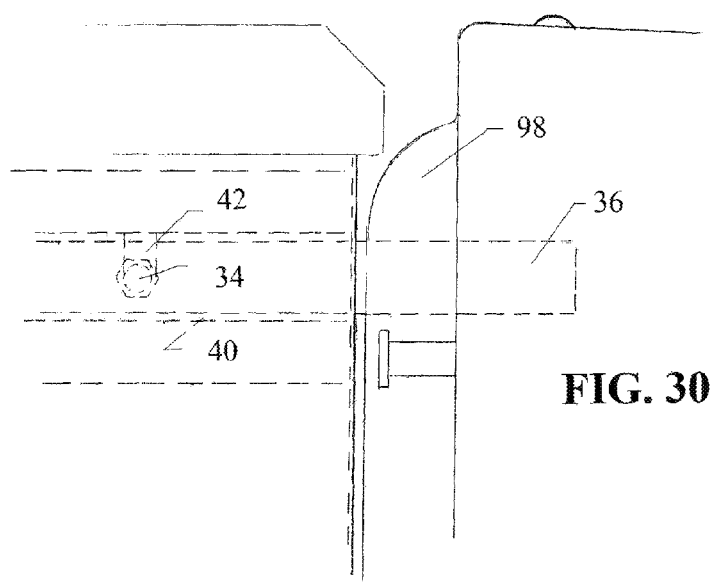
FIG. 30 is an elevation view of a horizontal locking pin and a hole for receiving the locking pin in a tailgate post for the pickup truck.
Figure 31:
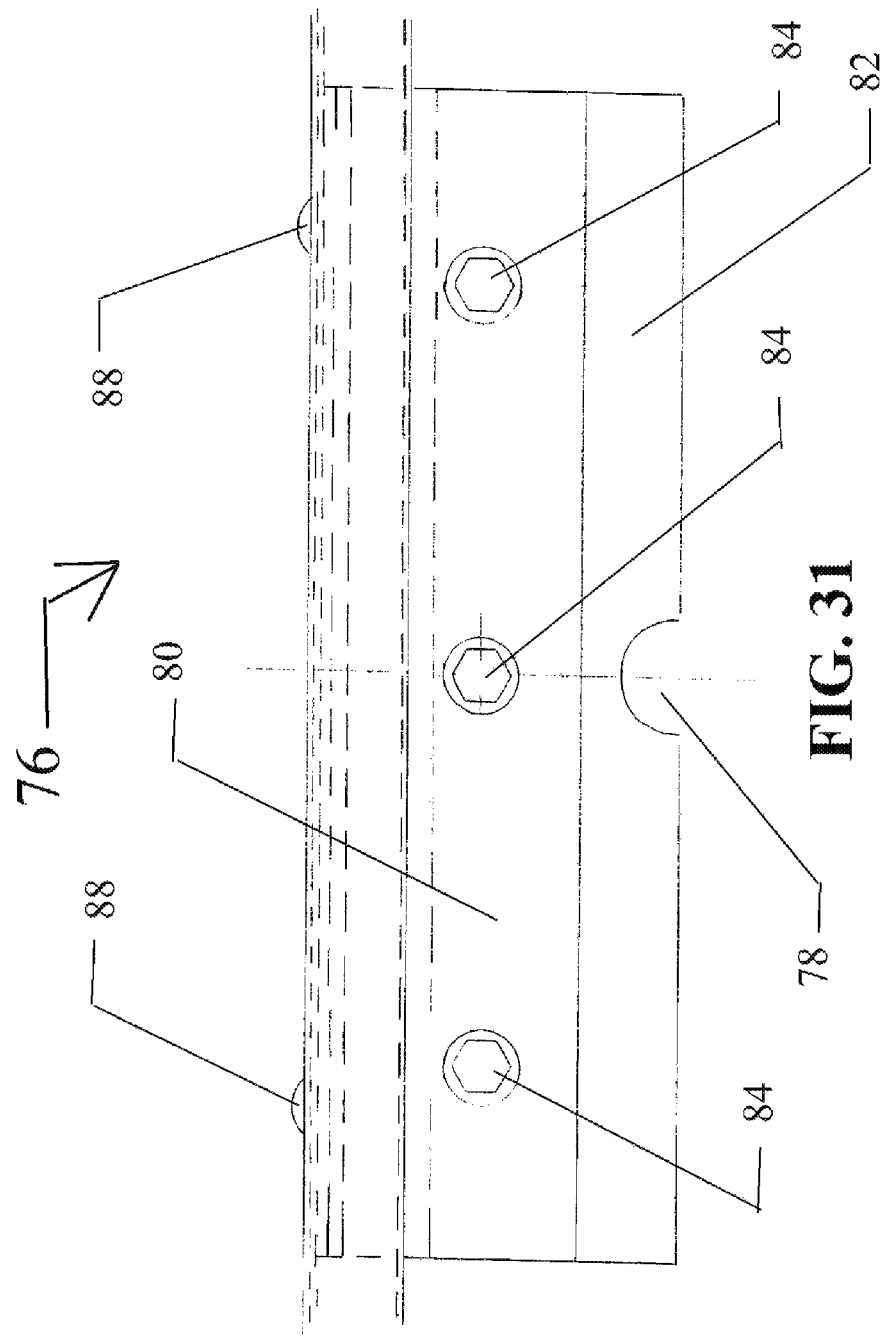
FIG. 31 is a left side elevation view of the horizontal pin receiver depicted in FIG. 29.
Figure 32:
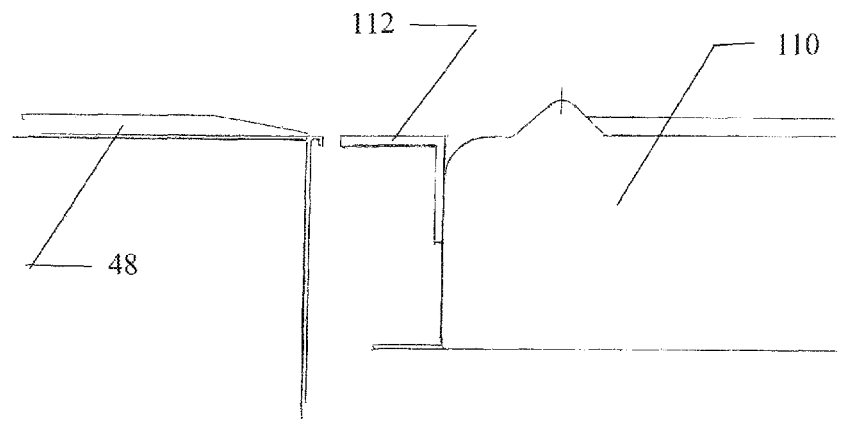
FIG. 32 is an elevation view of a tailgate bridge as shown in FIG. 28 with the tailgate in the open position.
Figure 33:
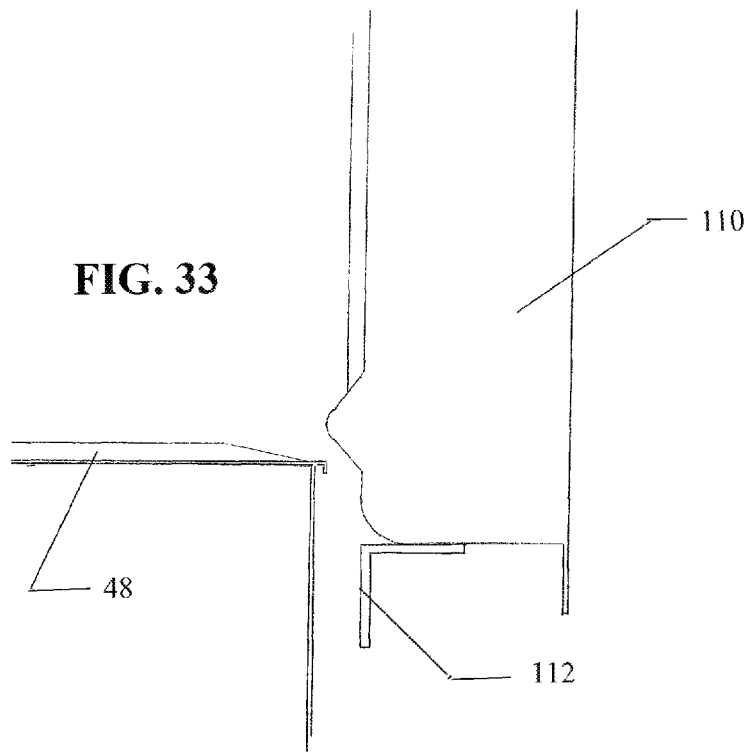
FIG. 33 is an elevation view of the tailgate bridge shown in FIG. 28 and FIG. 32 with the tailgate in the closed position.

Referring also to FIGS. 28 and 30, horizontal locking pins 36 can also engage through holes in the tailgate posts 98. In this way, storage box housing 12 can be secured at the end of the truck bed or on the tailgate 110. Referring also to FIGS. 32 and 33, a preferred form of tailgate bridge 110 comprises angle iron, which closed the gap between an open tailgate and bottom 48 of the truck bed, but allows the tailgate to close without changing any structure. With the use of the tailgate bridge, storage box housing 12 can not only be put into any position along the length of bottom 48 of the truck bed, but can also be locked into position shown in dashed lines on tailgate 110, or completely removed from the pickup. Such an arrangement also allows for multiple storage boxes to be securely fastened in the pickup truck bed. The storage boxes could be numerous coolers for a catering a large meal. The storage boxes could be multiple tool boxes with different types of tools or some other combination of coolers, tool boxes and other types of boxes.

Figure 26:
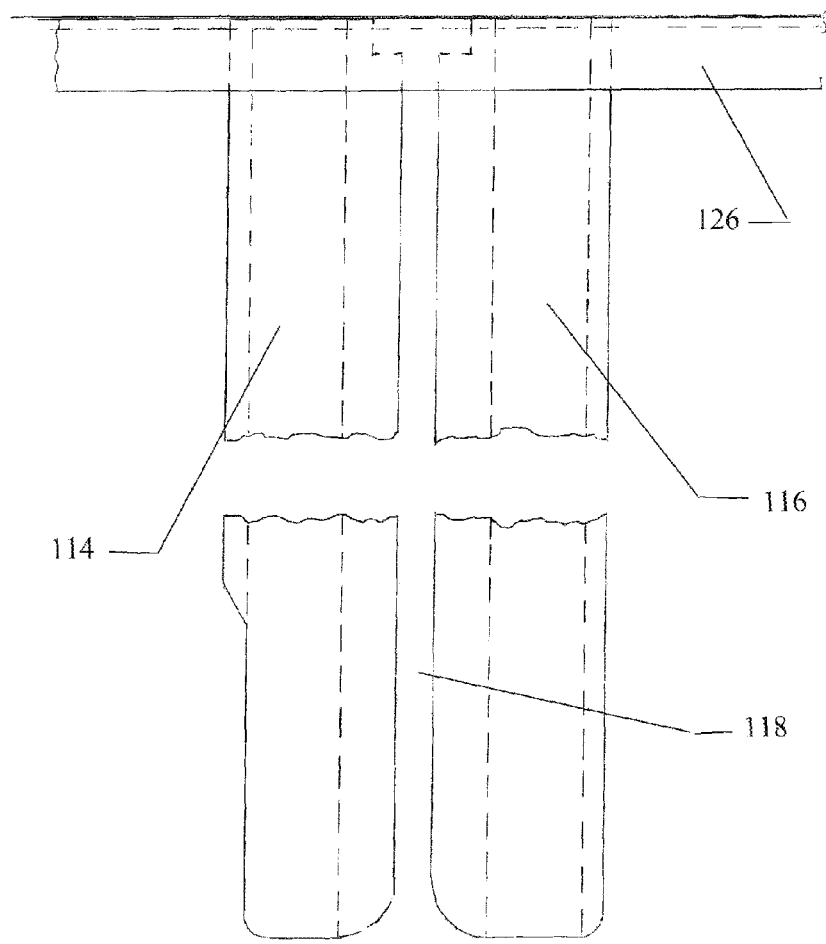
FIG. 26 is a top view of a pair of guides and a hold-down for one or more guide pins aligned with the pair of guides with a partial view of the bulkhead hold-down.
Figure 27:
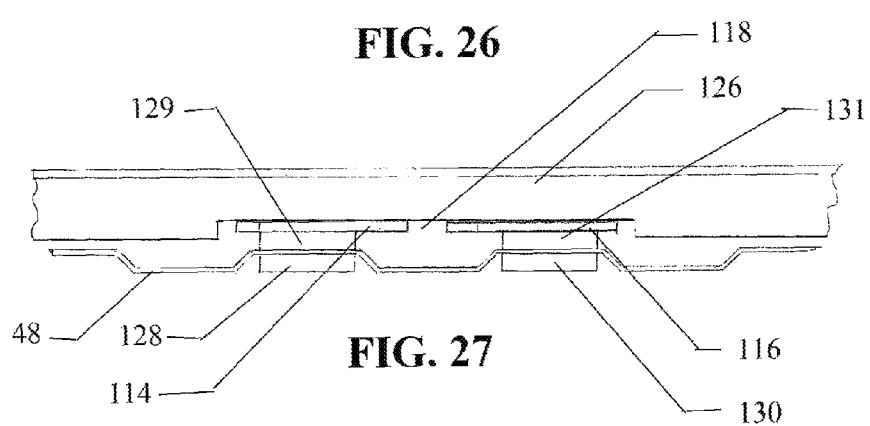
FIG. 27 is an elevation end view of the pair of guides of FIG. 26 with a partial view of the bulkhead hold-down.

Referring again to FIGS. 8, 26 and 27, guide pin hold-downs 114 and 116 form a slot 118 for aligned guide pins 22. Each guide pin 22 includes a bolt 120, which is fastened to trolley 20 by an inner nut 120 and an outer nut 122. A washer 124 rests against the head of bolt 120. Washer 124 is situated below guide pin hold-downs 114 and 116. Bolt 120 is narrow enough to fit into slot 118, but washer 124 is to wide so that it is held down by the guide pin hold-downs. Reinforcements 128 and 130 and corresponding spacers 129 and 131 secure the guide pin hold-downs to bottom 48 of the truck bed. Guide pins 22 keep storage box housing 12 centered between the sides of the truck bed. Guide pins 22 being held down by guide pin hold-downs 114 and 116 also add an additional security feature since storage box 12 cannot be lifted from the trailer bed with the guide pins secured by the hold-downs. Bulkhead hold-down 126 keeps housing 12 and its associated hardware from bouncing when the housing is located at the bulkhead, although the guide pins also ensure that the box is stable. Guide pin hold-downs 114 and 116 can run the total length of the truck bed. A mirror image of the guide pin hold-downs Referring now to FIG. 36, an optional reinforcement for vertical locking pin 26 includes a piece of angle iron 132 with a hole 134 for allowing vertical locking pin 26 to pass through. A reinforcing spacer 136 fits between trolley 20 and angle iron 132 so that vertical locking pin 26 is held in position by trolley 20, reinforcing spacer 136 and angle iron 132.

Referring now to FIGS. 37 and 38, an optional truck bed safety bracket 138 is extra security against storage box 12 lifting up by holding down lip 24 of trolley 20. A triangular support 140 gives strength to safety bracket 138. Spacer 142 brings the dip in bottom 48 to the same height as a ridge so that safety bracket 138 is level. Enforcement 144 holds down the safety bracket. In a typical arrangement, spacer 142 is welded to safety bracket 138, and enforcement 144 bolts to the bottom of the safety bracket. Spacer 142 bolts through the bed and a large washer.

Figure 34:
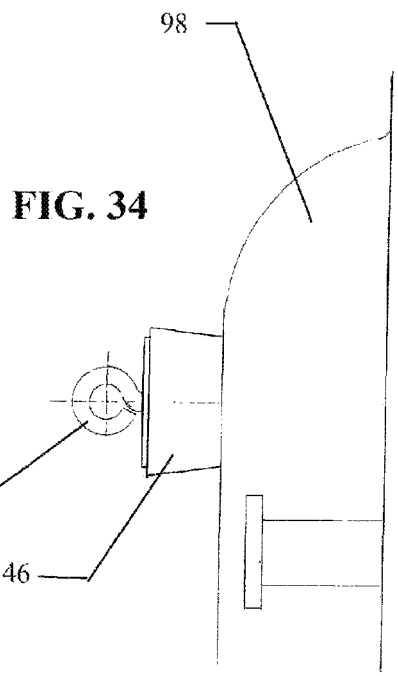
FIG. 34 is a plug for the hole in the tailgate post.

Referring to FIG. 34, a plug 148 is used to plug the hole in tailgate post 98 when the hole is not used for a horizontal locking pin. An eye-bolt 184 allows the plug to be attached to the truck by a chain so that it is not lost.

Figure 35:
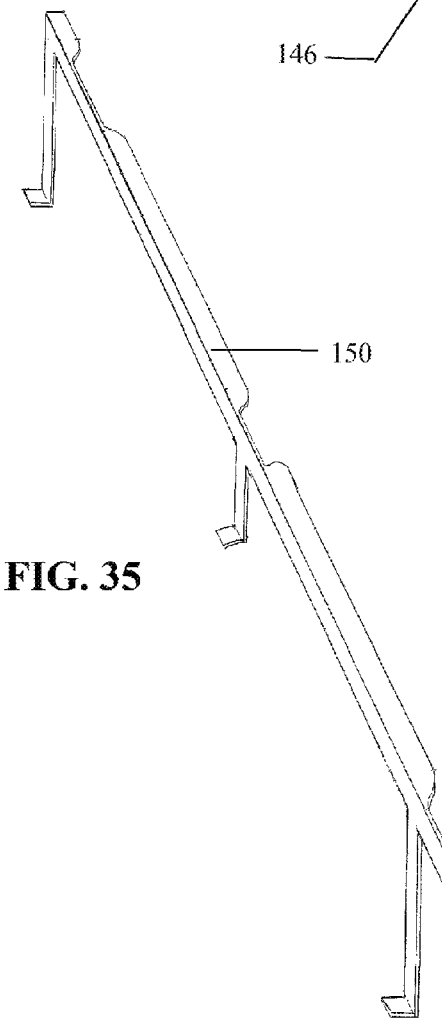
FIG. 35 is a perspective view of an angle iron reinforcement to allow multiple secure positions for the storage box in the bed.

Referring to FIG. 35, an optional length of angle iron 150 runs the length of the truck bed.

Referring to FIG. 22, a retriever/pusher 152 includes a handle 154 connected to a head 156. Retriever/pusher 152 makes it easy for a person to pull an unlocked storage box 12 toward the tailgate or push it toward the bulkhead without crawling into the truck bed.

Figure 39:
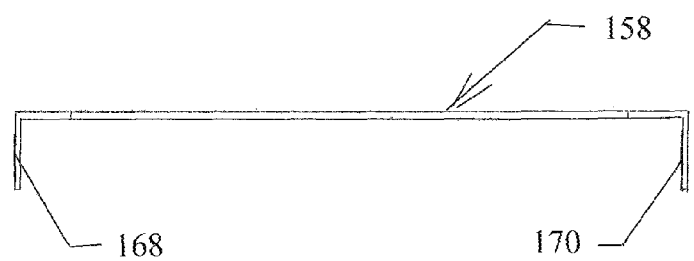
FIG. 39 is a top view of an interior box reinforcer.
Figure 40:
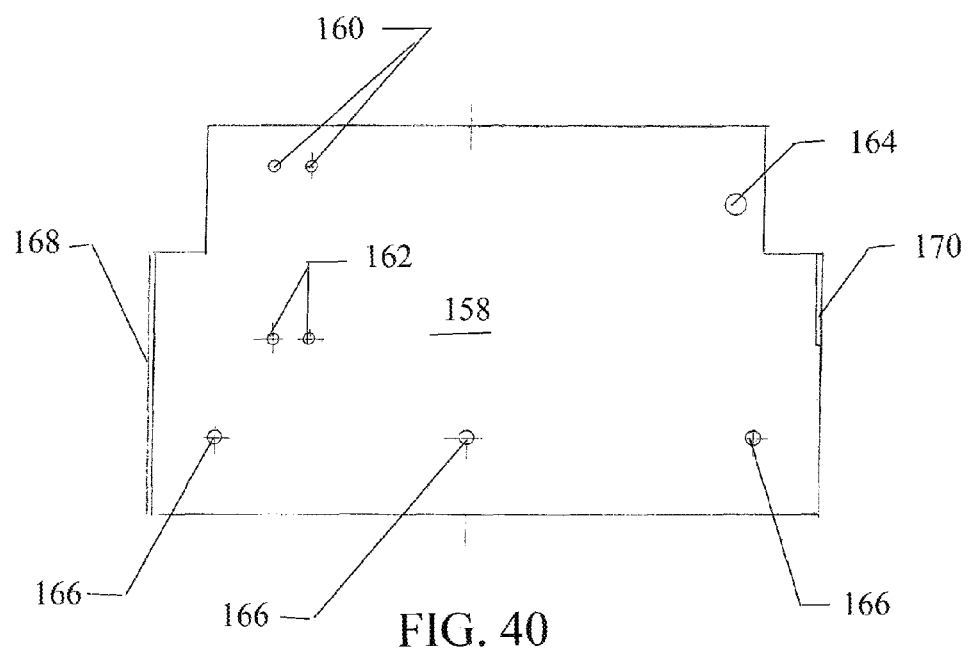
FIG. 40 is a front view of the interior box reinforcer of FIG. 39.

Referring now to FIG. 39 and FIG. 40, an interior reinforcer 158 for storage box housing 12 is normally made of steel. A steel reinforcer of sufficient strength as necessary because storage boxes for pickup truck beds are frequently made from thin material, which do not have the structural strength for many security features. Interior reinforcer 158 has a pair of holes 160 for attaching upper brackets 30 and 32 for vertical locking pin 26 and a pair of holes 162 for attaching lower bracket 44 for the vertical locking pin. Interior reinforcer 158 also has hole 164 for attaching one end of the piston (not shown) for storage box lid 14. Holes 166 are for attaching bolts to secure the interior reinforcer to the storage box housing. Holes 166 could be replaced with weld spots or other attachment means. Steel reinforcer From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A system for securely locking a storage box otherwise moveable along the length of a pickup bed having a bottom wall, a first side wall, a second side wall and a front wall, said bottom wall having a rear edge and a plurality of alternating dips and ridges running from the front wall to the rear edge, said system comprising:
   a storage box housing;
   a storage box lid;
   a lock for the lid, whereby the lid can be locked shut on the storage box;
   a plurality of wheels being rotatably coupled to and extending downwardly from the housing, wherein at least two wheels are positioned in and aligned with a first dip between two adjacent ridges and at least two wheels are positioned in and aligned with a second dip between two adjacent ridges; and
   at least two locking pins positioned inside the housing having both a retracted position entirely or almost entirely within the housing and a locking position partly within the housing and each locking pin partly into one wall of the truck bed, wherein the wall has a hole for receiving the locking pin and wherein the locking position can only be engaged and disengaged from inside the housing when the lid for the storage box is open, whereby the pins in the locked position cannot be disengaged when the lid is closed and locked.

2. A system according to claim 1 wherein the locking pin is a horizontal locking pin and wherein the one wall is a side wall and the hole is for receiving each horizontal locking pin is in the wall nearest to that horizontal locking pin.

3. A system according to claim 2 further including:
   a vertical locking pin positioned inside the housing having both a retracted position entirely or almost entirely within the housing and a locking position partly within the housing and partly within a ridge of the bottom wall, wherein the ridge has a hole for receiving the vertical locking pin and wherein the locking position can only be engaged and disengaged from inside the housing when the lid for the storage box is open, whereby the vertical pin in the locked position cannot be disengaged when the lid is closed and locked.

4. A system according to claim 1 further including:
   a reinforcement dip and adjacent ridges is installed in the dip used for the wheels aligned with the first dip and onto the adjacent ridges and a reinforcement dip and adjacent ridges is installed in the dip used for the wheels aligned with the second dip and onto the adjacent ridges to prevent the wheels from damaging the dips in the truck bed or to level out a damaged truck bed.

5. A system according to claim 4, wherein the reinforcement or each dip and adjacent ridges is stainless steel.

6. A system according to claim 2 further including:
   a reinforcement of the hole for receiving a horizontal locking pin in each side wall.

7. A system according to claim 6, wherein the reinforcement for each hole is iron or steel.

8. A system according to claim 3 further including:
   a reinforcement of each hole for receiving a vertical locking pin in a ridge.

9. A system according to claim 2, wherein the at least two locking pins for side walls is at least four locking pins, two on each side of the housing.

10. A system according to claim 1 wherein the locking pin is at least one vertical locking pin and wherein the one wall is the bottom wall of the truck bed and the hole is in the bottom wall is at least one hole for each vertical locking pin.

11. A system according to claim 10 further including:
   at least two horizontal locking pins positioned inside the housing having both a retracted position entirely within the housing and a locking position partly within the housing and one pin partly into each side wall, wherein each side wall has a hole for receiving a horizontal locking pin and wherein the locking position can only be engaged and disengaged from inside the housing when the lid for the storage box is open, whereby the pins in the locked position cannot be disengaged when the lid is closed and locked.

12. A system according to claim 10 further including:
   a reinforcement dip and adjacent ridges is installed in the dip used for the wheels aligned with the first dip and onto the adjacent ridges and a reinforcement dip and adjacent ridges is installed in the dip used for the wheels aligned with the second dip and onto the adjacent ridges to prevent the wheels from damaging the dips in the truck bed or to level out a damaged truck bed.

13. A system according to claim 12, wherein the reinforcement or each dip and adjacent ridges is stainless steel.

14. A system according to claim 11 further including:
   a reinforcement of the hole for receiving each horizontal locking pin in the nearest side wall.

15. A system according to claim 14, wherein the reinforcement for each hole is iron or steel.

16. A system according to claim 10 further including:
   a reinforcement of each hole for receiving a vertical locking pin in a ridge.

17. A system according to claim 10 further including:
   at least one guide pin coupled to and extending downwardly from the housing, wherein at least one guide pin is positioned in and aligned with a dip between two adjacent ridges, wherein the at least one guide pin helps position wheels and prevent the wheels from jumping from their respective dips and centering the storage box within the side walls of the truck bed and to provide extra security.

18. A system according to claim 2 further including:
at least one guide pin coupled to and extending downwardly from the housing, wherein at least one guide pin is positioned in and aligned with a dip between two adjacent ridges, wherein the at least one guide pin helps position wheels and prevent the wheels from jumping from their respective dips and to center the storage box between the side walls of the pickup truck bed.

19. A system for securely locking a storage box otherwise moveable along the length of a pickup bed having a bottom wall, a first side wall, a second side wall and a front wall, said bottom wall having a rear edge and a plurality of alternating dips and ridges running from the front wall to the rear edge, said system comprising:
a storage box housing;
a storage box lid;
a lock for the lid, whereby the lid can be locked shut on the storage box;
a plurality of wheels being rotatably coupled to and extending downwardly from the housing, wherein at least two wheels are positioned in and aligned with a first dip between two adjacent ridges and at least two wheels are positioned in and aligned with a second dip between two adjacent ridges;
at least one horizontal locking pin positioned inside the housing having both a retracted position entirely or almost entirely within the housing and a locking position partly within the housing and partly within a side wall and the hole is for receiving each horizontal locking pin is in the wall nearest to that horizontal locking pin and wherein the locking position can only be engaged and disengaged from inside the housing when the lid for the storage box is open, whereby the horizontal pin in the locked position cannot be disengaged when the lid is closed and locked; and
at least one vertical locking pin positioned inside the housing having both a retracted position entirely or almost entirely within the housing and a locking position partly within the housing and partly within a ridge of the bottom wall, wherein the ridge has a hole for receiving the vertical locking pin and wherein the locking position can only be engaged and disengaged from inside the housing when the lid for the storage box is open, whereby the vertical pin in the locked position cannot be disengaged when the lid is closed and locked.

20. A system for securely locking a storage box otherwise moveable along the length of a pickup bed having a bottom wall, a first side wall, a second side wall and a front wall, said bottom wall having a rear edge and a plurality of alternating dips and ridges running from the front wall to the rear edge, said system comprising:
a storage box housing;
a storage box lid;
a lock for the lid, whereby the lid can be locked shut on the storage box;
a plurality of wheels being rotatably coupled to and extending downwardly from the housing, wherein at least two wheels are positioned in and aligned with a first dip between two adjacent ridges and at least two wheels are positioned in and aligned with a second dip between two adjacent ridges; and
at least one horizontal locking pin positioned inside the housing having both a retracted position entirely or almost entirely within the housing and a locking position partly within the housing and partly within a hole in the side wall and the hole is for receiving each horizontal locking pin is in the side wall nearest to that horizontal locking pin and wherein the locking position can only be engaged and disengaged from inside the housing when the lid for the storage box is open, whereby the horizontal pin in the locked position cannot be disengaged when the lid is closed and locked; and
at least one vertical locking pin positioned inside the housing having both a retracted position entirely or almost entirely within the housing and a locking position partly within the housing and partly within a ridge of the bottom wall, wherein the at least one vertical locking pin has a wing near the bottom and the ridge has a hole for receiving the wing of vertical locking pin when turned in one direction but cannot be removed when inserted into hole and turned so that the wing locks into place and wherein the locking position can only be engaged and disengaged from inside the housing when the lid for the storage box is open, whereby the vertical pin in the locked position cannot be disengaged when the lid is closed and locked.

\* \* \* \* \*